United States Patent
Lyren

(10) Patent No.: US 11,519,695 B2
(45) Date of Patent: Dec. 6, 2022

(54) FIREARM SYSTEM THAT TRACKS POINTS OF AIM OF A FIREARM

(71) Applicant: Philip Scott Lyren, Wadsworth, OH (US)

(72) Inventor: Philip Scott Lyren, Wadsworth, OH (US)

(*) Notice: Subject to any disclaimer, the term of this patent is extended or adjusted under 35 U.S.C. 154(b) by 0 days.

(21) Appl. No.: 17/704,062

(22) Filed: Mar. 25, 2022

(65) Prior Publication Data
US 2022/0214138 A1     Jul. 7, 2022

Related U.S. Application Data

(63) Continuation of application No. 17/106,098, filed on Nov. 28, 2020, now Pat. No. 11,287,219, which is a continuation of application No. 16/596,751, filed on Oct. 8, 2019, now Pat. No. 10,852,100, which is a continuation of application No. 16/236,377, filed on Dec. 29, 2018, now Pat. No. 10,443,982, which is a continuation of application No. 15/953,501, filed on Apr. 16, 2018, now Pat. No. 10,168,123, which is a continuation of application No. 14/945,451, filed on Nov. 19, 2015, now Pat. No. 9,945,640.

(51) Int. Cl.
*G06T 17/00* (2006.01)
*F41G 1/54* (2006.01)
*G06T 7/20* (2017.01)
*F41A 17/06* (2006.01)
*F41G 3/02* (2006.01)
*F41G 3/16* (2006.01)

(52) U.S. Cl.
CPC ............. *F41G 1/54* (2013.01); *F41A 17/063* (2013.01); *F41G 3/02* (2013.01); *F41G 3/165* (2013.01); *G06T 7/20* (2013.01); *G06T 17/00* (2013.01); *G06T 2207/30212* (2013.01); *G06T 2207/30232* (2013.01); *G06T 2207/30241* (2013.01); *G06T 2215/16* (2013.01)

(58) Field of Classification Search
None
See application file for complete search history.

(56) References Cited

U.S. PATENT DOCUMENTS

2013/0071815 A1* 3/2013 Hudson ............... F41G 3/2655
434/19

* cited by examiner

*Primary Examiner* — Robert J Craddock

(57) ABSTRACT

A firearm system includes a firearm and a computer. Electronics in the firearm determine data that includes a pathway between different points of aim of the firearm as the firearm moves. The computer receives this data and builds an image of the pathway between the different points of aim of the firearm.

20 Claims, 8 Drawing Sheets

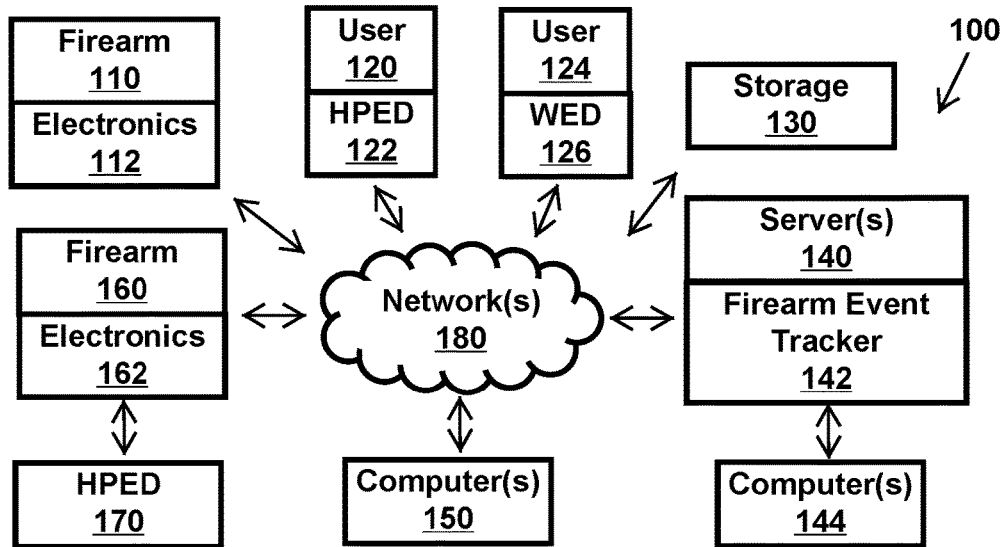

Figure 1

| Determine events that include tracking a continuous path between different points of aim of a firearm as the firearm moves between the different points of aim while at a location. 200 |

↓

| Transmit, from the firearm to a remote computer, event data that includes the continuous path between the different points of aim of the firearm as the firearm moves between the different points of aim while at the location. 210 |

↓

| Reconstruct, at the remote computer and from the event data, the evens that include the continuous path between the different points of aim of the firearm as the firearm moves between the different points of aim while at the location. 220 |

↓

| Display, at the remote computer, a reconstruction of the events that include showing an image of the location and the continuous path between the different points of aim of the firearm on the image of the location. 230 |

Figure 2

FIREARM SYSTEM THAT TRACKS POINTS OF AIM OF A FIREARM

BACKGROUND

In many circumstances, individuals and organizations want to track the location of a firearm. Location data alone, however, may not offer sufficient information to assist these individuals and organizations.

Advancements in firearm devices and systems will further assist in development of firearm technology.

BRIEF DESCRIPTION OF THE DRAWINGS

FIG. 1 is a firearm system in accordance with an example embodiment.

FIG. 2 is a method to reconstruct and display events of a firearm in accordance with an example embodiment.

SUMMARY OF THE INVENTION

Figure 3A:
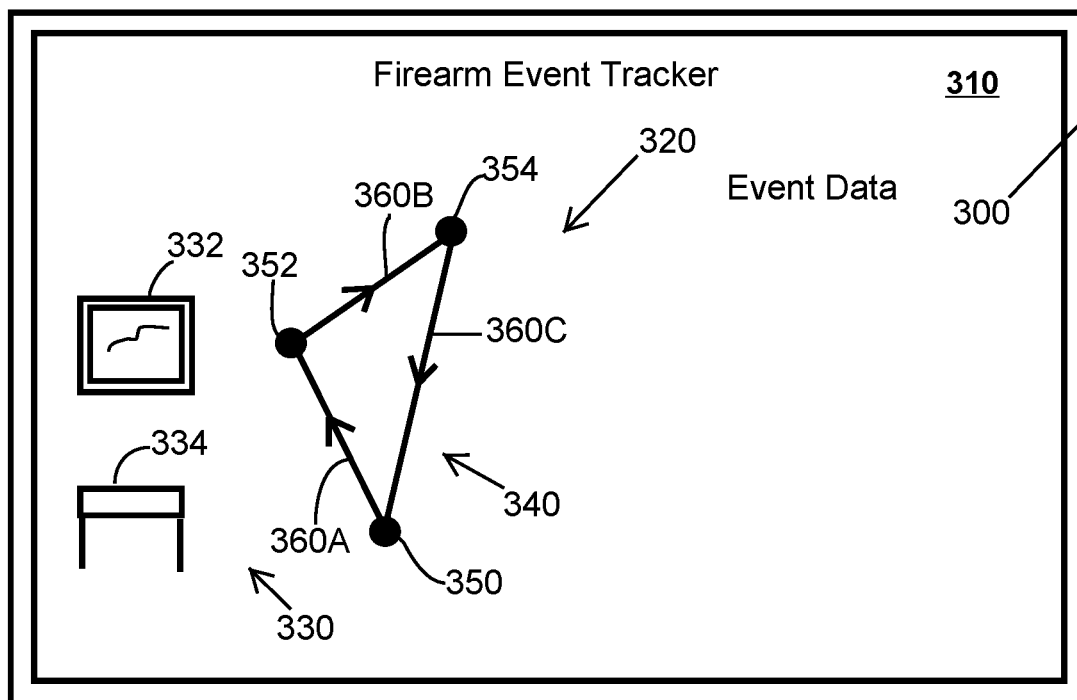
FIG. 3A is an electronic device that displays event data for a firearm in accordance with an example embodiment.

One example embodiment includes a firearm system with a firearm and a computer. Electronics in the firearm determine data that includes a pathway between different points of aim of the firearm as the firearm moves. The computer receives this data and builds an image of the pathway between the different points of aim of the firearm.

Another example embodiment includes a firearm event tracker that tracks events of a firearm. These events include a direction of a point of aim of the firearm and an angle of inclination of the firearm in the direction of the point of aim.

Other example embodiments are discussed herein.

DETAILED DESCRIPTION

Example embodiments include systems, apparatus, and methods that determine event data for a firearm (such as tracking a pathway of a point of aim of the firearm, determining a direction and an angle of the point of aim of the firearm, and determining other events discussed herein).

In an example embodiment, one or more electronic devices track locations of where a firearm aims. These locations can include a continuous path of where the firearm is pointed over a period of time or over a duration of an event (e.g., while a finger of a user is on a trigger of the firearm or while the user grips the firearm). The path is stored, transmitted, processed, and displayed on one or more computers or electronic devices so that a viewer of the computer or the electronic device can see where the firearm is pointed (e.g., real-time data showing where the firearm is pointed), where the firearm was pointed (e.g., historic data showing where the firearm was pointed in the past), and/or where the firearm will be pointed (e.g., predicting where the firearm will be pointed at a future time or during a future time frame or during a future event).

A computer system, computer, and/or one or more electronic devices, including the firearm itself, can collect, store, display, transmit, and/or process event data that includes not only the path of the point of aim of the firearm but also events with or related to the firearm (such as loading the firearm, firing the firearm, removing the firearm from a holster, gripping the firearm, cocking the firearm, placing a finger on a trigger of the firearm, recording video and audio proximate to the firearm, another firearm firing near the firearm, etc.).

A computer system, computer, and/or electronic device processes the event data and reconstructs the events with or related to the firearm. Reconstruction of the events enables a user or a computer or an electronic device to determine what transpired or what is transpiring with the firearm.

In an example embodiment, a display displays the path where the firearm was pointed and/or where the firearm is pointed. This path can be overlaid or presented on an image or video of a location of the firearm and presented from a point of view of the firearm, from a point of view of a holder of the firearm, or from another point of view. For example, lines or planes or other images (including images of the firearm) on the display represent where the firearm was pointed during a period of time. For instance, these lines, planes, and/or images emulate, show, or reproduce one or more of points or areas in space where a barrel of the firearm is pointed, a line of sight of the firearm, a direction of aim of the firearm, a point of impact of a projectile fired from the firearm, a line of trajectory of a projectile fired from the firearm, and other information and events discussed herein.

In an example embodiment, the firearm includes electronics that determine or assist in determining events and event data, such as a path where the firearm is pointed or aimed and various other events discussed herein. By way of example, these electronics include a clock, a location device (such as global positioning system (GPS) locator), a directional device (such as a compass or device to determine direction of the firearm), and an inclination or angle indicator (such as a sensor to determine an angle of inclination of where the firearm is pointed or aimed).

With data from these electronics with the firearm, a computer or computer system builds or reconstructs a three-dimensional (3D) model that shows different locations where a user holding the firearm was or is located while at a location and that shows both an angle and a direction of where the firearm was or is pointed at each of the different locations where the user held or holds the firearm. The model can also show other information and event data, such as showing how the firearm was rotated or moved in 3D space at the location.

An example embodiment determines a direction of a point of aim of the firearm and also determines how the firearm was positioned or angled in 3D space at its location (even if the firearm remains stationary or fixed at a particular location). For example, while a handgun is positioned at a particular location, the handgun can be rotated or moved about three different axes (such as rotating the handgun about an X-axis, a Y-axis, and/or Z-axis of a Cartesian coordinate system). This movement can also be described as yaw (rotation around the Z-axis), pitch (rotation around the Y-axis), and roll (rotation around the X-axis). Thus, even when the handgun is stationary at a particular GPS location, the handgun can still be moved or rotated about one or more of these axes. An example embodiment determines, tracks, processes, transmits, and/or displays movement of the firearm about one or more of these axes.

Movement about these axes dictates not only how or where the firearm was held at a location but also where the firearm was aimed while at the location. This determination can be made from information about one or more of the axes (such as knowing a degree or amount or rotation for the X-axis, Y-axis, and/or Z-axis). This information can assist in determining ballistic information, such as a trajectory path of a bullet fired from a gun. For instance, law enforcement can locate where a bullet fired from a gun did land or should have landed. This information can also assist in recreating or re-enacting movement of the firearm about these axes at one or more locations. For instance, law enforcement can recreate or view in real-time how the firearm moved through space (e.g., motions of the firearm as it falls or as it fell, motions of the firearm as it is being held or as it was held, motions of the firearm as it is being fired or as it was fired, etc.).

Consider an example in which a user grips a handgun. The action of gripping the handgun activates an event tracking system or firearm event tracker, and the action of releasing (un-gripping) the handgun deactivates the event tracking system or firearm event tracker. When activated, this even tracking system senses, transmits, processes, and stores event data that includes, but is not limited to, a height of the handgun from ground, a GPS location of the handgun, an identification of the person gripping or holding the handgun, a compass direction of where the handgun is pointed at the GPS location, an angle of inclination of where the handgun is pointed at the GPS location, an angle of rotation of the handgun while being held, a date and time (including the time that the user grips the handgun), a distance to a target or to an object at which the handgun is pointed, a point of impact (actual or predicted) of a bullet fired from the handgun, an identity of the point of impact (i.e., an identity of what a bullet fired from the handgun will impact), and other event data discussed herein.

The event tracking system displays real-time or historic images or video of this event data at a location that is remote from the handgun so a third party, electronic device, computer, or a computer system can monitor these events in real-time or reproduce these events from the collected event data and other information. Reproduction or reconstruction of these events includes building one or more two-dimensional (2D) or 3D models of the events and/or locations where the events occur.

FIG. 1 shows a computer system, firearm system, or a firearm tracking system 100 in accordance with an example embodiment. The computer system includes a firearm 110 with electronics 112, a user 120 with a handheld portable electronic device (HPED) 122, a user 124 with a wearable electronic device (WED) 126, storage 130, one or more servers 140 with a firearm event tracker or firearm event tracking system 142, one or more computers 144 coupled to or in communication with the one or more servers 140, one or more computers or electronic devices 150, a firearm 160 with electronics 162, a HPED 170 in communication with the firearm 160 with electronics 162, and one or more networks 180 through which one or more of the electronic devices communicate.

The event tracker or event tracking system 142 includes software and/or hardware (including specialized hardware adapted or configured for a special purpose) that execute one or more methods or blocks discussed herein of an example embodiment.

By way of example, a computer includes, but is not limited to, handheld portable electronic devices (HPEDs), wearable electronic glasses (WEG), watches, wearable electronic devices (WED), portable electronic devices, computing devices, electronic devices with cellular or mobile phone capabilities, digital cameras, desktop computers, servers, portable computers (such as tablet and notebook computers), electronic and computer game consoles, home entertainment systems, handheld audio playing devices (example, handheld devices for downloading and playing music and videos), personal digital assistants (PDAs), combinations of these devices, devices with a processor or processing unit and a memory, and other portable and non-portable electronic devices and systems.

The electronics in the firearm include, but are not limited to, one or more of an audio recorder (including a microphone), a clock, a processing unit or processor, application-specific integrated circuit (ASIC), specialized hardware, a computer readable medium (CRM) or memory, a display, one or more interfaces (such as a network interface, a graphical user interface, a natural language user interface, and/or an interface that combines reality and virtuality), one or more recognizers (such as object recognition software, facial recognition software, and/or animal recognition software), one or more sensors (such as micro-electro-mechanical systems sensor, a motion sensor, an optical sensor, radio-frequency identification sensor, a global positioning satellite sensor, a solid state compass, gyroscope, an accelerometer, and/or a weather sensor), a camera, a global positioning system, a distance determiner (such as a laser, a rangefinder, a camera, and/or a camera), an orientation determiner (such as a tilt sensor, inclinometer, a gyroscope, and/or an accelerometer), and an environmental determiner (such as a thermometer, a barometer, a humidity sensor, a wind vane, an anemometer, a compass, and/or software to obtain weather or environmental conditions data). These electronics can be housed in, attached to, or engaged with the firearm or another device (such as an electronic scope or other electronic device that communicates with the firearm, such as an HPED).

Storage 130 includes one or more of a database, a data center, semiconductor storage, read-write random-access memory (e.g., Dynamic-RAM or DRAM), hard disk drives, optical disc drives, memory, secondary storage, and other storage devices.

The one or more networks 180 include one or more of the internet, an intranet, an extranet, a cellular network, a local area network (LAN), a home area network (HAN), metropolitan area network (MAN), a wide area network (WAN), a wired network, or another network over which data is wirelessly transmitted.

FIG. 2 is a method to reconstruct and display events of a firearm in accordance with an example embodiment.

Block 200 states determine events that include tracking a continuous path between different points of aim of a firearm as the firearm moves between the different points of aim while at a location.

For example, electronics in, on, or with the firearm can perform one or more of sense, gather, collect, process, transmit, determine, and store the event and data of the event.

Block 210 states transmit, from the firearm and to a remote computer, event data that includes the continuous path between the different points of aim of the firearm as the firearm moves between the different points of aim while at the location.

For example, the firearm transmits via a wired or wireless connection the event data to a computer, another electronic device, or storage.

Block 220 states reconstruct, at the remote computer and from the event data, the events that include the continuous path between the different points of aim of the firearm as the firearm moves between the different points of aim while at the location.

The remote computer processes, reconstructs, recreates, or builds the continuous path from the event data. This continuous path shows where the firearm was pointed or aimed over a time period.

Block 230 states display, at the remote computer, a reconstruction of the events that includes showing an image of the location and the continuous path between the different points of aim of the firearm on the image of the location.

Reconstruction of the event data provides a visual playback or view of where the firearm was pointed and/or is being pointed simultaneously along multiple different axes (such as the X-axis, Y-axis, and Z-axis). The reconstruction can be presented or displayed in 2D, 3D, augmented reality, or virtual reality.

Consider an example in which a handgun includes a sensor that senses when a user grips or grabs the handgun. This sensor sends a signal to activate event tracking of a point of aim of the handgun. As the user moves the handgun around while it is in his hand, electronics in the handgun continuously track and record event data (such as a compass direction of the barrel or point of aim (e.g., rotation along a Z-axis), angle of inclination of the barrel (e.g., rotation along an X-axis), angle of rotation of the handgun (e.g., rotation along the Y-axis), a height of the handgun from ground, a distance of the handgun from a body of the user, a time and date, GPS information (e.g., a GPS location of the handgun and/or user), and an identity of the user or holder of the handgun). The handgun wirelessly transmits this event data to a remote computer that processes the event data. The remote computer displays all of this data or portions of this data. This data can be displayed textually or with other visual formats (such as modeling the data in a 3D environment).

In addition to displaying the data, the display shows one or more of an impact location, pathway or path of where the handgun was pointed, an impact location, pathway or path of where the handgun is being pointed (e.g., a real-time point of aim), a pathway or path of a trajectory of a fired bullet (e.g., a trajectory and impact location of a bullet actually fired from the handgun), and a pathway or path of a trajectory of a bullet for a current point of aim (e.g., a trajectory and an impact location of bullet if the handgun were fired).

An image or video at the remote computer enables a user to see not only where the handgun is located but also a direction of a point of aim, a point of impact of a bullet fired from the handgun, and an angle or orientation of the handgun while pointed in the particular direction. For example, a user at the remote computer can see the point of view of the handgun (e.g., see along the line of sight or along the point of aim of the handgun). The user can also see a path where the handgun was moved while it was at its location and how the handgun was moved or rotated while in the hand of the user as the user moved the handgun along this path.

Consider an example in which an event tracking system or firearm event tracker tracks event data for a handgun (or other firearm) during a time interval that endures for one minute. During this time interval, a user holds the handgun in his right hand, points it in the air, and moves the handgun along several large circular motions. The event tracking system processes the event data and reproduces, on a display, the pathway showing where the handgun moved during the time interval. For instance, the display shows the motion as large circular paths that emulate or copy or reproduce the large circular motions through which the handgun physically and actually moved. These circular paths can be displayed on, over, or with images or video of the actual location of the handgun so a user can see or recreate where the handgun was located and how it moved at this location.

The event tracking can also show a path or pathway of a point of impact of the bullet fired from the firearm. Each time the firearm moves, a point of impact is calculated and presented on a display. A user is thus able to see a path or locations of the points of impact. These points of impact include locations where bullets were actually fired or locations where bullets would land if the firearm were fired.

The event tracking can also show a path or pathway of a point of aim the firearm. Each time the firearm moves, a point of aim is calculated and presented on a display. A user is thus able to see a path or locations of the points of aim.

Consider an example in which law enforcement apprehend a suspect on a charge of aggravated assault with a deadly weapon. A witness claims that the suspect pointed a handgun at a victim during a robbery. The suspect claims that he never pointed the handgun at the victim or even used the handgun during the robbery. Law enforcement review event data from the handgun to determine a truth to these issues. A firearm event tracker shows who held the handgun and where it was pointed during the robbery.

Consider an example in which a first person picks up a handgun, and a second person at a remote location monitors movement of the handgun on an HPED. As the first person holds the handgun in a firing position, electronics in the handgun transmit images or video to the HPED of the second person. The second person is able to see event data, such as where the handgun is pointed. The HPED, however, displays additional information, such as a height of the handgun from the ground, a 3D image of the handgun in the hand of the first person, and an orientation of the handgun along an X-Y-Z coordinate system. As the handgun moves along one or more of the X-axis, Y-axis, and Z-axis while in the hand of the first person, the display of the HPED displays these movements in real-time such that movements of the actual handgun coincide with the movements of the 3D image of the handgun on the display.

Event data can be captured or determined periodically, continuously, or continually over a time period or during an event. For example, event data is captured at discrete increments of time (e.g., capturing data every second, half-second, quarter second, tenth of a second, hundredth of a second, etc.). Each data point includes the specific event data for that time increment.

Event data can also include actions that the user performs on the firearm, such as the user placing a finger on the trigger, the user loading the firearm, the user cocking the firearm or moving the hammer, the user gripping or grabbing the firearm, the user moving the firearm, the user aiming the firearm, the user firing the firearm, the user removing the firearm from a holster or storage location, and the user providing a command to the firearm (such as a verbal command or instruction to the firearm, a gesture-based command, or a command through a user interface).

Event data, however, is not limited to being captured in response to user-initiated events. By way of example, a firearm can commence to capture event data upon receiving a command from a remote computer or remote electronic device. By way of example, capturing of event data commences upon an occurrence of an event, such as the firearm capturing a sound (such as capturing sound of another firearm discharging or capturing sound of a person), the firearm being located at a predetermined geographical location, a time of day or calendar day, the firearm being proximate to a predetermined object or person, the firearm moving, the firearm experiencing an impact or force, the firearm or another electronic device or computer recognizing a face of a person at which the firearm is pointed or directed, the firearm or another electronic device or computer recognizing an object at which the firearm is pointed or directed, etc.

Consider an example in which a remote computer receives event data from a firearm and builds a 3D model that shows different locations where a user holding the firearm was located. While at each of the locations, the model also displays an image of the firearm so a viewer can see both an angle and a direction of where the firearm was pointed and/or is pointing at each of the different locations. For instance, movements of the image of the firearm emulate or copy in real-time movements of the actual firearm.

FIGS. 3-8 show a firearm event tracker that displays events and event data. Example embodiments are not limited to displaying circles, lines, or a particular type of visual representation to show an event or event data. One skilled in the art would appreciate that other visual and/or audio can be displayed or provided to a viewer (such as displaying or providing different types of cues, indicia, mechanisms, alerts, text, sounds, shapes, lines, 2D shapes, 3D shapes, virtual images, augmented images, etc. to the user).

FIG. 3A shows a computer or an electronic device 300 with a display 310 that displays event data 320 for a firearm. The event data 320 includes an image or video 330 of a location of where the firearm is located. For illustration, this location is a room that includes a window 332 and a table 334. The event data 320 also includes a continuous pathway or path 340 and one or more events, such as events 350, 352, and 354.

The path 340 can represent or show one or more of the paths or pathways discussed herein. For illustration, the path 340 shows where the firearm moved through space or its movements while it was physically at the location in the room. Event 350 shows where the firearm was located when event tracking commenced. As shown, a user moved the firearm from a location at event 350 along a somewhat triangular path that includes three legs 360A, 360B, and 360C. The firearm was raised upwardly and to the left from the location at event 350 along path 360A, then transitioned upwardly and to the right along path 360B, and then moved downwardly and slightly left along path 360C until the firearm returned to the location at event 350.

FIG. 3A uses round black circles to show where or when events occurred along the path 340. As shown, events occurred at 350, 352, and 354. These circles provide a user with a visual indication that an event occurred at the particular location or time (i.e., where the black circle exists).

Figure 3B:
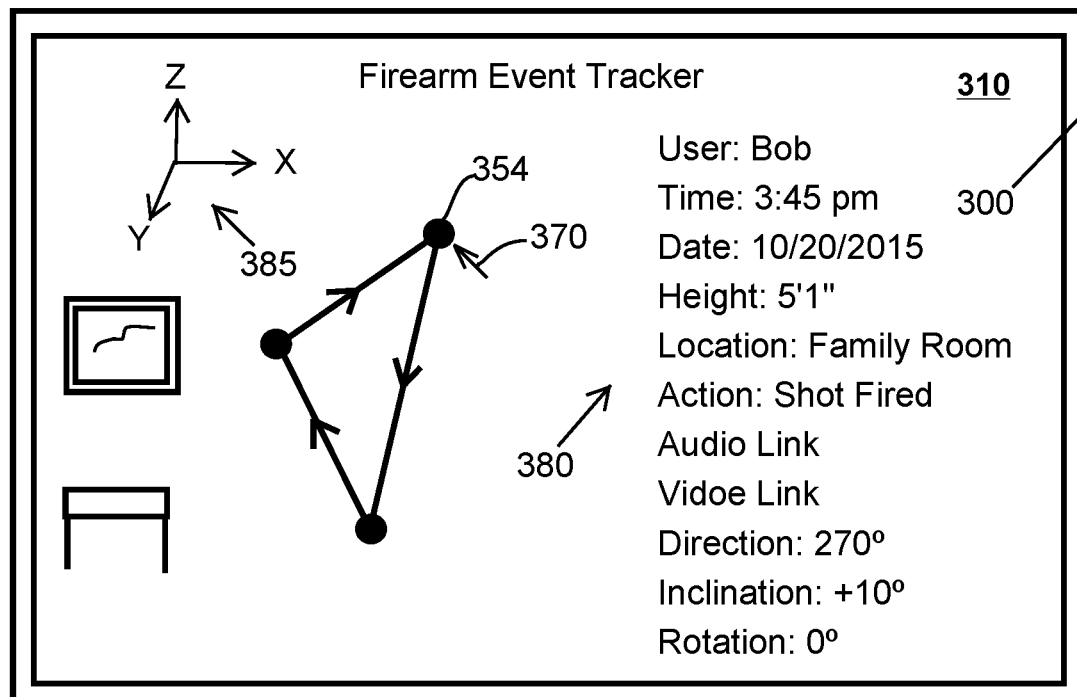
FIG. 3B is the electronic device of FIG. 3A that displays event data for an event of the firearm in accordance with an example embodiment.

In FIG. 3B, the display 310 of the computer or electronic device 300 displays event data for event 354. Specific event data for a location along the path is recorded and displayed. For example, when a cursor 370 moves to location 354, the display 310 displays event data 380. By way of example, this event data 380 includes a user or holder of the firearm (shown as "User: Bob"), a time of the event (shown as "Time: 3:45 pm"), a date of the event (shown as "Date: Oct. 20, 2015"), a height of the gun when the event occurred (shown as "Height: 5'1"), a location of the event (shown as "Location: Family room"), an action of the event (shown as "Action: Shot fired"), an audio recording of the event (shown as "Audio Link"), a video recording of the event (shown as "Video Link"), a direction of a point of aim of the firearm (shown as "Direction: 270°"), an angle of inclination of the point of aim of the firearm (shown as "Inclination: +10°"), and an angle of rotation of the firearm (shown as "Rotation: 0°"). The display provides an X-Y-Z coordinate 385 for a frame of reference.

Event data can be displayed or provided for locations along the path 340. FIG. 3B shows one example in which event data is shown for the location at 354. A user, though, could point the cursor 370 to other locations along the path 340 to retrieve and display event data for that location or for that point in time. Alternatively, the event data or events can play as a video.

The cursor is shown as one example for retrieving event data. One skilled in the art will appreciate that the user could use other methods to retrieve event data (such as a verbal command, a gesture-based command, a drill-down sequence, a drag-n-drop action, keystrokes or a keyboard, an electronic pen, or other actions performed through a user interface with an electronic device or a computer).

Figure 3C:
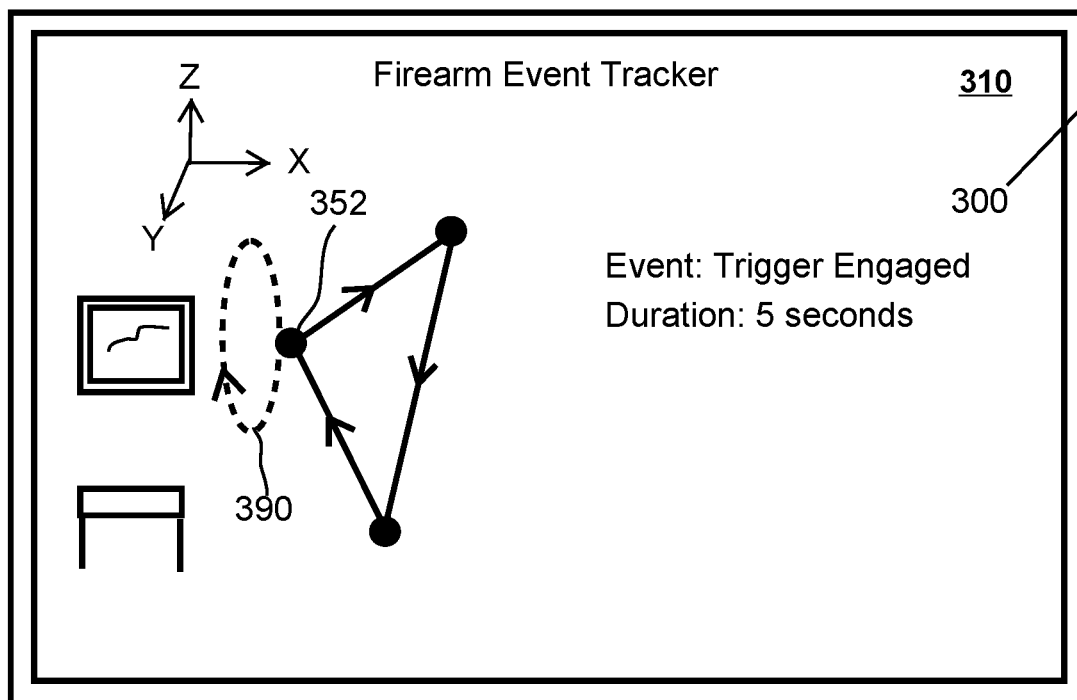
FIG. 3C is the electronic device of FIG. 3A that displays event data for an event of the firearm in accordance with an example embodiment.

In FIG. 3C, the display 310 of the computer or electronic device 300 displays event data for event 352. At this location, the user placed his finger on the trigger (shown as "Event: Trigger engaged"). The firearm was located at this location for five seconds (shown as "Duration: 5 seconds"). While the firearm was at this location, a point of aim or direction of the barrel moved along the 3D pathway or path shown with dotted line 390.

FIG. 3C shows that the user raised the firearm to a point shown as event 352, and then rotated or turned the barrel of the firearm while holding it at this location. The point of aim was rotated along the circular curved path 390 while the firearm was located at this point in space.

Consider an example in which a user (while standing upright) holds a handgun in his hands with his arms in an extended firing or aiming position. While in this aiming position, the user holds his arms level and still, but moves his wrists or hands such that the direction or point of aim of the handgun changes. This motion of the barrel of the handgun can be unintentional since it is extremely difficult to hold a handgun outright in a shooting position with the handgun perfectly still. Alternatively, the motion of the barrel may be intentional as the user adjusts the point of aim or moves the point of aim for another reason. Regardless of the reason for the motion, an event tracking system senses, records, and processes these motions in order to reproduce the point of aim on a display of a computer.

An example embodiment can simultaneously record and display multiple events and event data at the same time. A user or a computer can select which event or event data to display.

Figure 4:
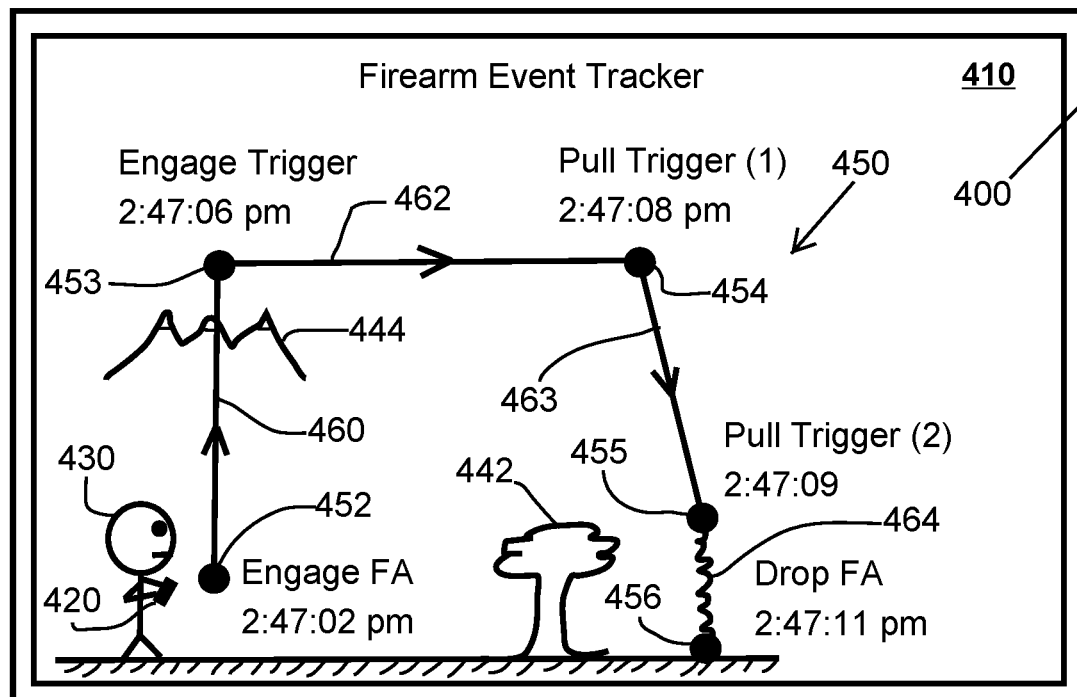
FIG. 4 is an electronic device that displays event data while tracking a firearm in accordance with an example embodiment.

FIG. 4 shows a computer or an electronic device 400 with a display 410 that displays events and event data while tracking a firearm 420 that a user 430 holds. The user stands outdoors at a location that includes a tree 442 and mountains 444. For illustration, the events and event data are shown along a timeline or chronology along a path 450 with certain events shown at 452-456. This path 450 appears at the location where the user 430 of the firearm 420 stands and emulates or shows motions of the firearm while at the location.

As shown on the display 410 at event 452, the user 430 engages the firearm (FA) at 2:47:02 pm (i.e., two seconds after the time of 2:47 pm). The user can take one of various actions to engage the firearm 420, such as grabbing the firearm, holding the firearm, unlocking the firearm, loading the firearm, etc.

A third party (or the user himself) can retrieve or view the event data by activating the event 452, such as clicking on the display or using another method to access specific information or specific details regarding what occurred at event 452.

After engaging the firearm 420, the user 430 raises the firearm and/or raises a point of aim of the firearm as shown along leg 460 of path 450. Another event 453 occurs at 2:47:06 pm when the user 430 engages a trigger on the firearm (i.e., the user puts his or her finger on the trigger).

The user then moves the firearm 420 and/or the point of aim of the firearm as shown along leg 462 of path 450. Another event 454 occurs at 2:47:08 pm when the user 430 pulls the trigger of the firearm and fires a shot from the firearm.

After firing a first shot, the user then moves the firearm 420 and/or the point of aim of the firearm as shown along leg 463 of path 450. Another event 455 occurs at 2:47:09 pm when the user 430 pulls the trigger of the firearm and fires a second shot from the firearm.

After firing a second shot, the user then drops the firearm 420 as shown along leg 464 of path 450, and the firearm hits the ground at event 456 at 2:47:11 pm.

Event data enables a computer or computer system to replay or play events that occur with a firearm. By way of example, a display shows one or more of the point of view of the user of the firearm (e.g., a camera of a wearable electronic device on the user captures what the user sees), the point of view of the firearm (e.g., a sensor or camera on, in, or with the firearm captures a view along the barrel or point of aim of the firearm), the point of view of another person, or the location from multiple points of view (e.g., satellite images or previously captured images of the location).

Consider an example of event data per FIG. 4 in which the user is a suspect in a criminal investigation. A firearm event tracking system records, builds, and replays the events as shown in FIG. 4. With this event data, police officers can go to the location of where the user was standing with the firearm and re-enact the events. For instance, the police officers can see where the suspect was standing, where he held the firearm, which direction he pointed the firearm, how he moved the firearm, where the firearm was located and pointed when the two shots were fired, where and when the firearm was dropped, etc. This information would be important in helping to convict the suspect or exonerate the suspect (depending on the charges against the suspect or circumstances of the investigation). Furthermore, this information would assist the police officers in locating the two bullets that were fired from the firearm since the event data includes a height of the firearm, a compass direction of the firearm when it was fired, and an angle of inclination of the firearm when it was fired. With this information and other information (such as a make and model of the firearm, ammunition used, and environmental data, such as wind direction and speed), the firearm event tracking system calculates a trajectory path of each of the two bullets, displays this trajectory path, and estimates or predicts a point of impact for each of the two bullets. The firearm event tracking system further provides a GPS location or GPS area of where the bullets would have landed. Alternatively, an exact or estimated location on a object is provided (such as showing a location on a building or other object where a bullet is located or where a bullet is likely located or predicted or estimated to be located).

Figure 5A:
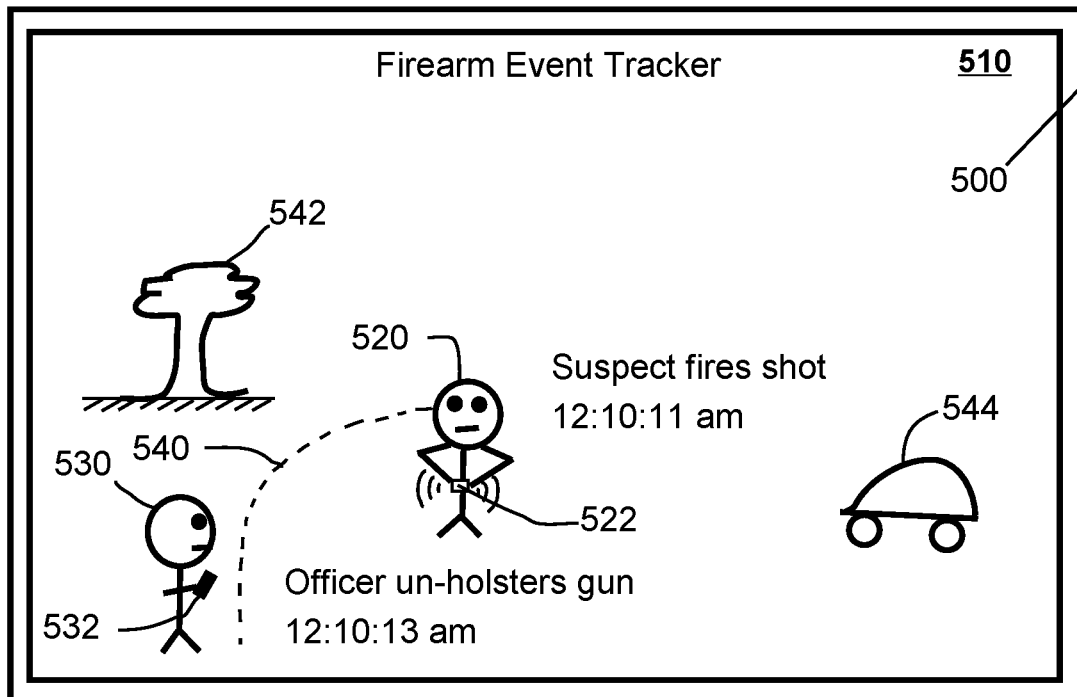
FIG. 5A is an electronic device that displays event data of a firearm in accordance with an example embodiment.
Figure 5B:
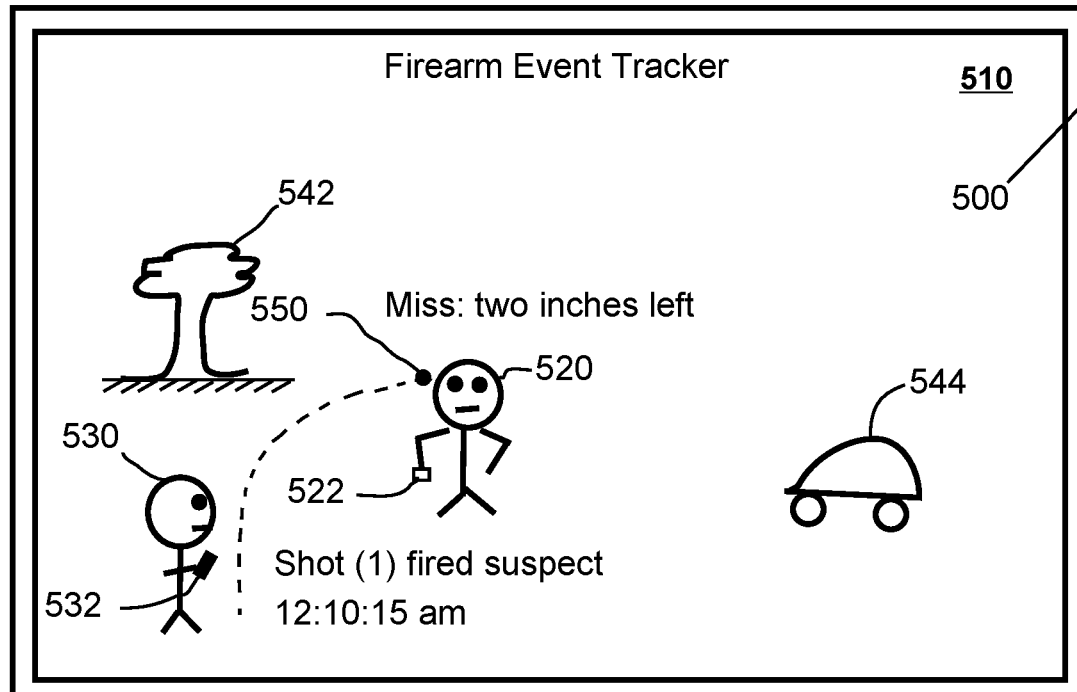
FIG. 5B is the electronic device of FIG. 5A that displays more event data of the firearm in accordance with an example embodiment.
Figure 5C:
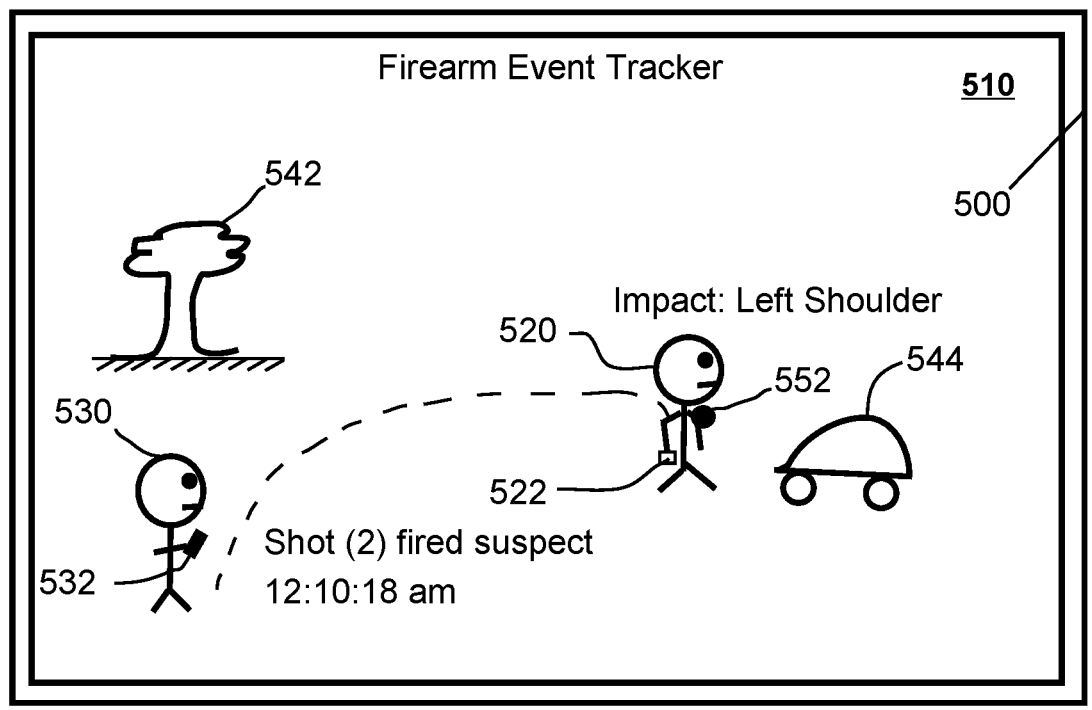
FIG. 5C is the electronic device of FIG. 5A that displays more event data of the firearm in accordance with an example embodiment.

A firearm event tracking system or firearm event tracker in accordance with an example embodiment can calculate and display different types of events and event data. By way of example, FIGS. 5A-5C show a computer or an electronic device 500 with a display 510 that displays event data from a firearm event tracking system or firearm event tracker. In these events, a suspect 520 fires a firearm 522 at a police officer 530 who, in return, fires two shots with a firearm 532 at the suspect 520.

FIGS. 5A, 5B, and 5C display and model the events as simplified line drawings (e.g., stick figures) for illustration. The events and event data can be displayed with more sophisticated imagery, such as screen shots, real-time video, recorded video, 2D models, 3D models, images (real or virtual), animation, indicia, visual information, audio information, augmented reality, virtual reality, and combinations thereof.

As shown in FIG. 5A, the suspect 520 fires a shot with the firearm 522 at the officer 530 at 12:10:11 am. Two seconds later (at 12:10:13 am), the officer 530 raises and/or aims his firearm 532 as shown along path 540. For example, this path shows one or more of movement of the firearm 532 in the hands of the officer 530, a point of aim of the firearm 532, and a trajectory path of a bullet if bullet were fired from the firearm 532. These events occur outdoors at a location that includes a tree 542 and a car 544, by way of example illustration.

As shown in FIG. 5B, the officer 530 fires a first shot at the suspect 520 at 12:10:15 am (four seconds after the suspect fired at the officer). Event 550 shows a dot where the bullet missed the suspect. As seen, the first shot missed the suspect 520 by two inches ("Miss: 2 inches left").

As shown in FIG. 5C, the suspect 520 flees toward a vehicle 542 after the officer 530 fires the first shot. The officer fires a second shot at 12:10:18 am (three seconds after firing the first shot at the suspect). Event 552 shows a dot and indicates that the bullet hit the suspect 520 in the left shoulder ("Impact: Left Shoulder").

The firearm event tracker provides users (such as law enforcement) with real-time event information and also records and stores events for proof or evidence as to what actually transpired at a location. For instance, event data from FIGS. 5A-5C shows that the suspect fired first at the officer, and the officer fired in response to the suspect firing at the officer. The event data can show other information as well, such as whether the officer had a clear, unobstructed, or safe shot when firing at the suspect, points of aim or lines of sight of the firearm of the officer or the suspect, points of impact of bullets fired from the firearms, ballistic trajectories of bullets fired from the firearms, audio and video of the events, how the gun moved while in the hand of the officer, and other event data or information in accordance with an example embodiment.

Figure 6A:
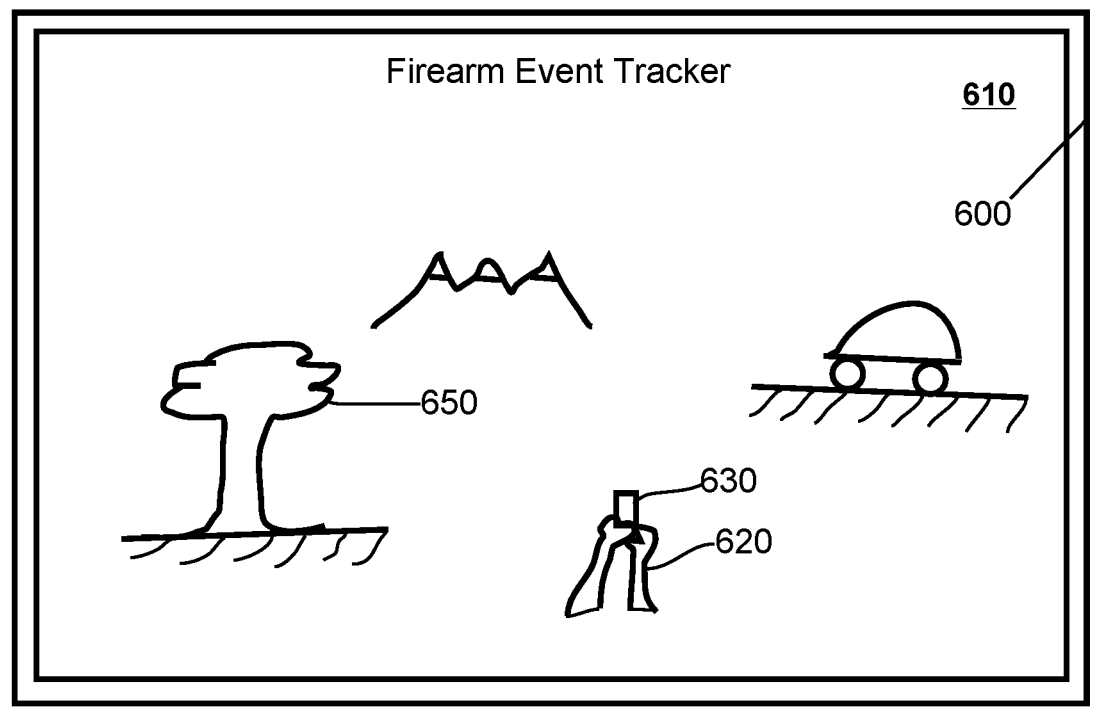
FIG. 6A is an electronic device that tracks points of impact of a bullet of a firearm in accordance with an example embodiment.
Figure 6B:
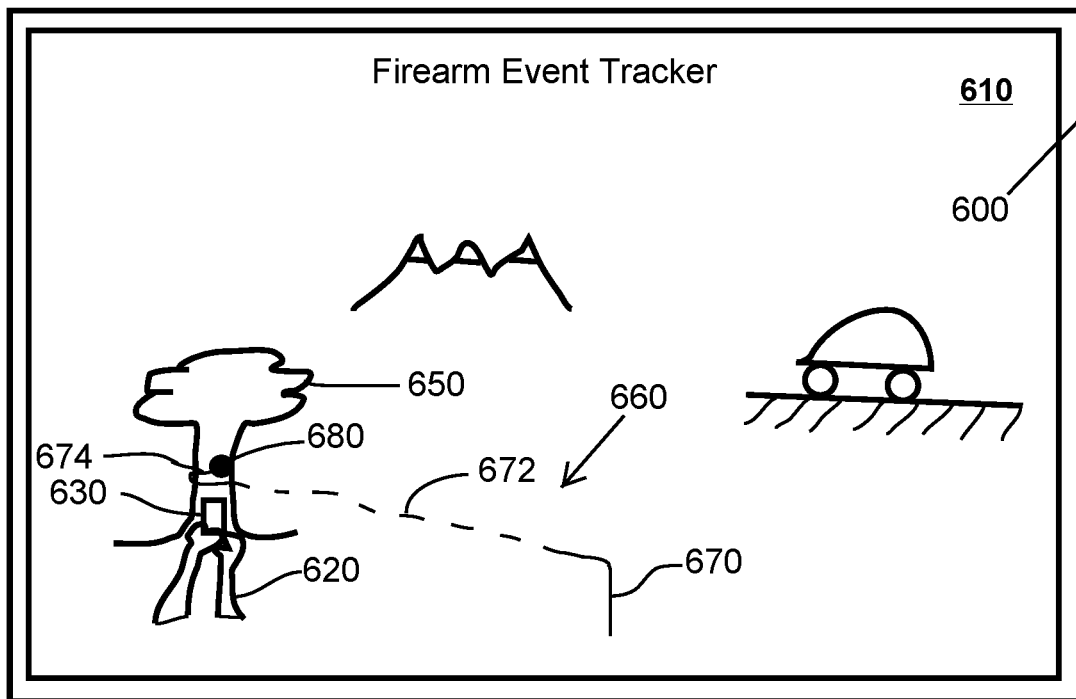
FIG. 6B is the electronic device of FIG. 6A that tracks points of impact of the bullet of the firearm in accordance with an example embodiment.

FIGS. 6A and 6B show an example in which a firearm event tracker calculates and displays real-time images of points of impact from a bullet of a firearm if the firearm were to fire. The figures show a computer or an electronic device 600 with a display 610 that shows arms and hands of a user 620 with a firearm 630 while standing at an outdoor location.

The user 620 initially holds or points the firearm 630 at the ground and then moves the firearm 630 and points it at a tree 650. A path 660 shows potential or estimated points of impact of a bullet fired from the firearm 630 as the user 620 moves the firearm from the position shown in FIG. 6A to the position shown in FIG. 6B.

Solid line 670 of path 660 indicates an actual point of impact was calculated. In this instance, a bullet fired from the firearm 630 would impact locations along line 670. By way of example, a user can click on a particular location on the line to get more information about the point of impact (such an image of the point of impact, a distance to the point of impact, a bullet trajectory to the point of impact, a time when the firearm was pointed at the point of impact, an orientation of the firearm at this position, and other data discussed herein).

Dashed line 672 of path 660 indicates that the points of impact were not able to be calculated or were calculated but not displayed on the display. For example, the points of impact occur too far away (such as a mile or more away from the location of the user 620), or the points of impact could not be calculated for another reason (such as lack of mapping data for the location). Solid line 674 occurs on tree 650 and shows actual points of impact if the firearm 630 were fired. A dot or circle 680 shows the current point of impact for the firearm 630.

The firearm event tracker can thus estimate and display current and historic points of aim and actual or estimated points of impact when the firearm is discharged or fired. This information assists in viewing and/or recreating events that occurred or are occurring with the firearm.

Consider an example in which a law enforcement officer draws his gun in a metropolitan area, aims it at a suspect, and does not fire the firearm. A firearm event tracking system or a firearm event tracker calculates points of impact of a bullet if the firearm is fired and presents these points of impact to the officer, another officer, and/or a computer system. For example, an electronic device with the officer or on the firearm indicates that it is not safe to fire the firearm since a point of impact would or likely cause unwanted collateral damage. Thus, the firearm event tracker assists the officer in making informed decisions on whether to fire the firearm or not.

Consider further the example above in which the officer decides not to discharge his weapon in the metropolitan area. The officer and his superior later review the event data and clearly see from this data that the officer was correct in not firing his gun at the suspect since a bullet fired from the gun could have hit a spectator or hit a vehicle of an innocent person. The historic event data also assists in training the officer and other officers.

Consider further the example above in which the officer decides not to discharge his weapon in the metropolitan area. When the officer removes his weapon from his holster, this event triggers an alert that wirelessly transmits to other officers. The firearm event tracker can also provide, in real-time, the other officers with event data discussed herein (such as providing them with a point of aim of the officer's gun, a line of sight of the officer and his gun, trajectory paths of a bullet fired from the officer's gun, images as seen from a point of view of the officer and/or his gun, a location of the officer, 2D or 3D models of events and event data at the location of the officer and his gun, etc.).

Figure 7:
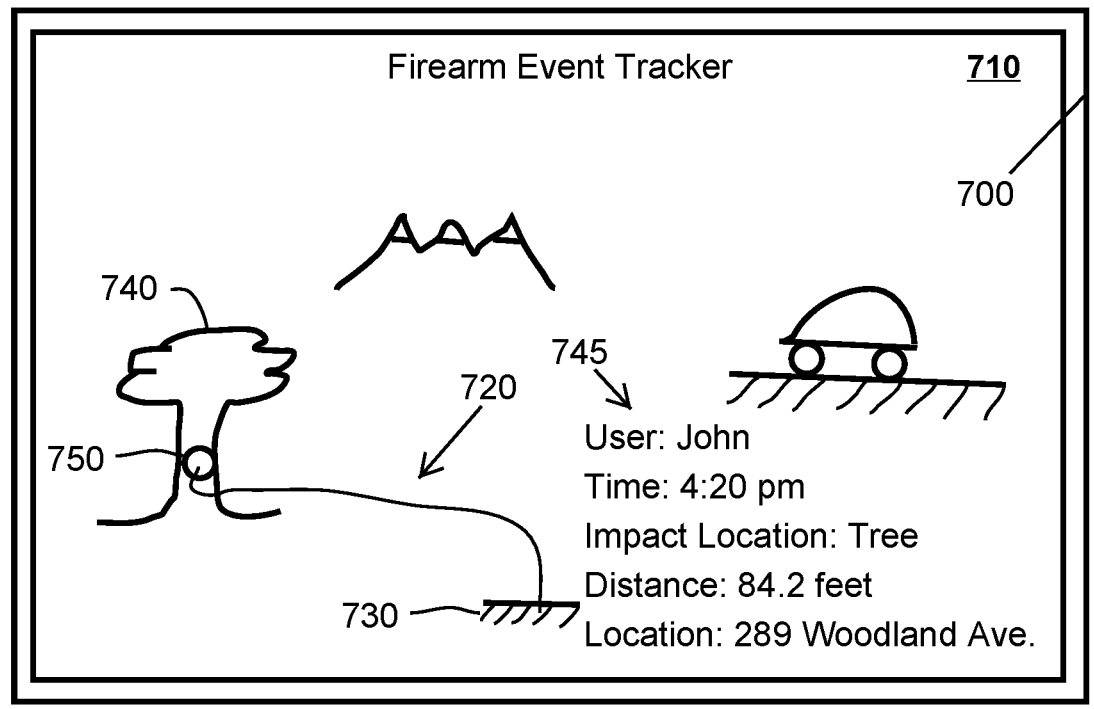
FIG. 7 is an electronic device that displays event data of a point of aim of a firearm in accordance with an example embodiment.

FIG. 7 shows a computer or an electronic device 700 with a display 710 that displays event data of a path 720 of a point of aim of a firearm. As shown, the firearm was initially aimed or pointed at the ground 730 and then moved to point at the tree 740. Event data 745 shows that a user (named John) fired at shot (at 4:20 pm) into the tree 740 (Impact Location: Tree) that was located away from the user (distance of 84.2 feet from John) at a GPS location (shown as an address of 289 Woodland avenue). The bullet fired from the firearm struck the tree at a point of impact 750 (shown with a circle on the tree and a dot in the middle that is four feet from the ground).

With the information from FIG. 7, a person can see where the user (John) was standing when he fired the firearm, where the firearm was moved or aimed (i.e., along path 720), where the firearm was pointed when it was fired (i.e., at the tree), and where the point of impact of the bullet fired from the firearm hit the tree (i.e., shown at the center of the circle on the tree that is four feet from the ground).

As noted, a point of impact can be the actual location where the firearm event tracker determines where the bullet hit the tree. For example, the bullet marks the tree to indicate a point of impact on the tree. The point of impact can also be a predicted or estimated point of impact. For example, the firearm event tracker predicts a ballistics trajectory of where the bullet will impact. Calculation of an impact location and other information is discussed in patent application having Ser. No. 14/823,510 and entitled "Weapon Targeting System" and patent application having Ser. No. 14/823,528 and entitled "Weapon Targeting System," both applications being incorporated herein by reference.

Figure 8:
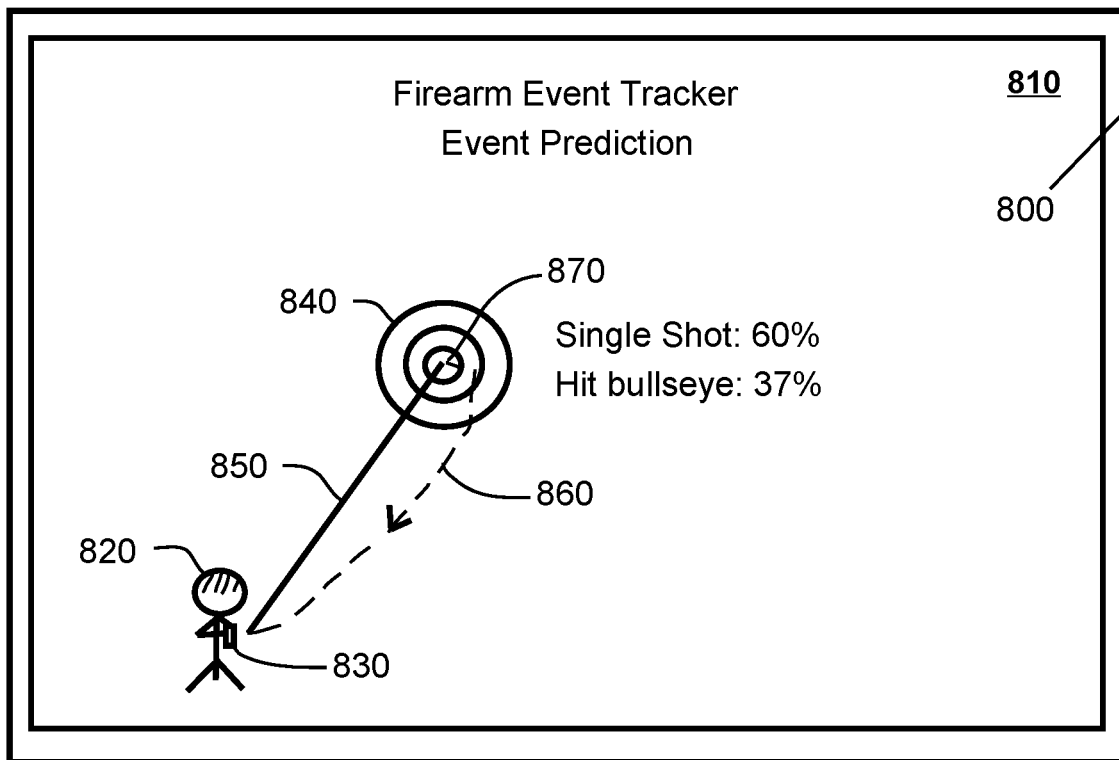
FIG. 8 is an electronic device that displays a prediction of an event of a firearm in accordance with an example embodiment.

FIG. 8 shows a computer or electronic device 800 with a display 810 that shows a user 820 aiming a firearm 830 at a target 840. The computer or electronic device executes and/or includes a firearm event tracker that predicts or estimates an event or event data for the user 820 with the firearm 830. For example, a solid line 850 shows a point of aim or direction of aim of the firearm 830 as the user actually raises the firearm 830 and aims it at the target 840. The firearm event tracker predicts that the user will fire a single shot but miss the bullseye left of center and then lower the firearm until the point of aim is directed to the ground.

The display 810 displays the prediction an estimated or predicted path 860 shown as dotted lines. The path 850 (shown as a solid line) indicates the actual point of aim of the firearm 830, and the path 860 (shown as a dashed line) indicates a predicted point of aim or direction of aim of the firearm 830 at a future time. The display 810 also indicates other predictive data, such that the user will fire a single shot (60% probability) and hit the bullseye (37% probability). Further, a predicted location of the missed shot is shown as an estimated or predicted event 870.

Prediction data can assist law enforcement and others in accurately estimating or predicting what action a user will take with a firearm. This information can assist law enforcement in making better or more informed decisions while encountering users with firearms.

Consider an example in which a police officer encounters a suspect with a handgun. A firearm event tracking system provides the police officer with event data that includes, but is not limited to, the following information: The suspect is a 27 year old female named Jane. She has fired the handgun two times at a target 40 feet away and missed the target wide left both times. She has no other experience with firearms, and the firearm is believed to not be loaded (with an unloaded predicted accuracy of 95%). Based on this information, the police officer can make a more informed decision on how to confront and address the suspect Jane.

Figure 9:
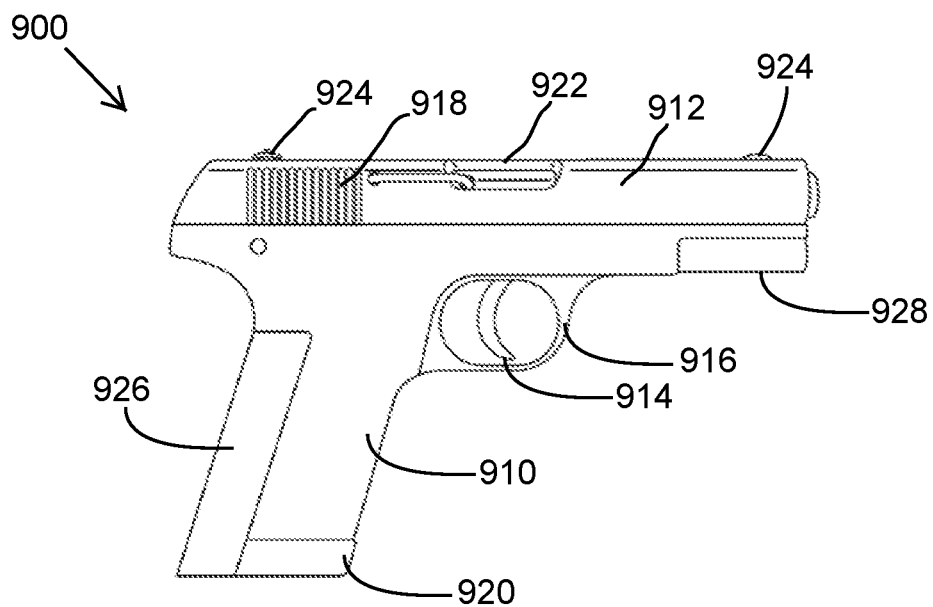
FIG. 9 is a firearm shown as a handgun in accordance with an example embodiment.

FIG. 9 is a firearm 900 (shown as a handgun) that includes a handle 910, a barrel 912, a trigger 914, a trigger guard 916, a slide action or cocking mechanism 918, an ammunition housing or clip 920, a shell ejection port 922, sights 924, electronics 926 located in, on, or with the handle 910, and electronics 928 located in, on, or with the barrel.

The electronics are housed or enclosed in a plastic, metal, and/or wooden structure separate from the firearm. Alternatively or additionally, a structure or body of the firearm itself provides a housing or enclosure for the electronics. For example, the electronics removably attach to the firearm or are permanently attached to the firearm. Further, the electronics may be fully or partially enclosed in the firearm, such as being not visible or accessible to a user of the firearm or being partly visible or accessible to the user.

Although FIG. 9 shows an example embodiment as a handgun, example embodiments in accordance with the invention can also be implemented in other types of firearms, such as rifles, shotguns, pistols, and other portable weapons. Further, electronics 926 and 928 can be located in, on, or with various parts of the firearm including, but not limited to, one or more of the barrel, housing, handle, action, sights (such as a permanent or removable electronic scope), trigger, trigger guard, or other parts of the firearm.

Figure 10:
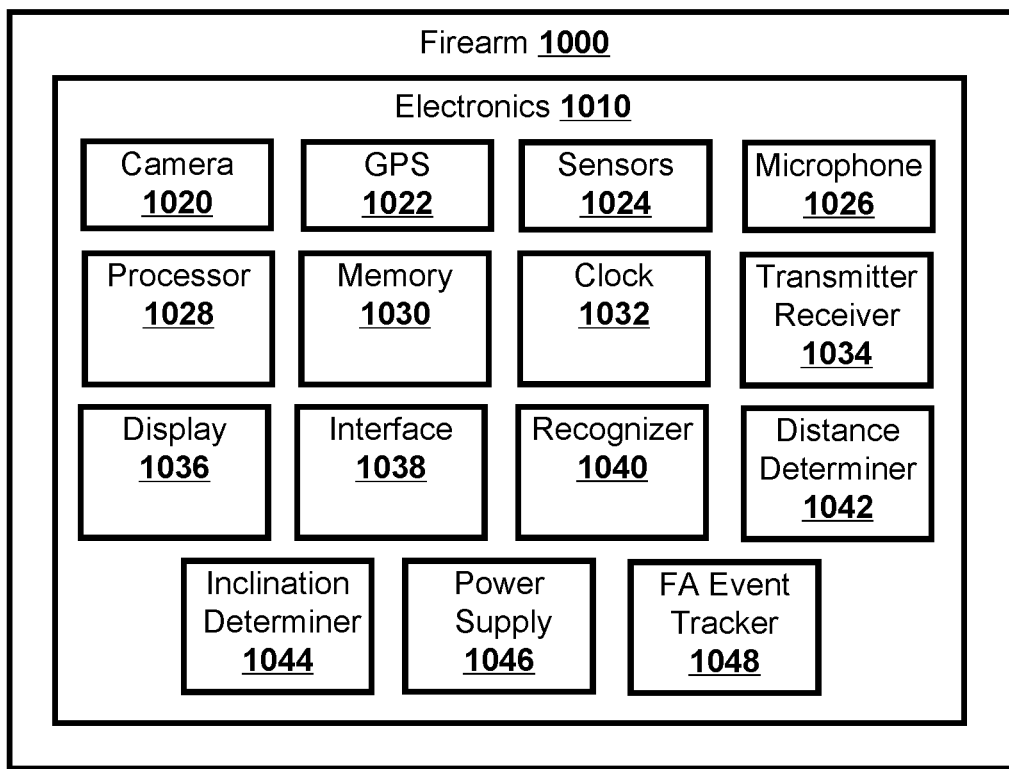
FIG. 10 is a firearm with electronics in accordance with an example embodiment.

FIG. 10 is a firearm 1000 with electronics 1010. The electronics include one or more of a camera 1020, a GPS locator or GPS system or GPS tracking unit 1022, one or more sensors 1024 (such as one or more of a micro-electro-mechanical systems sensor, a motion sensor, an optical sensor, radio-frequency identification sensor, a global positioning satellite sensor, a solid state compass, gyroscope, and an accelerometer), a microphone 1026, a processor or processing unit 1028 (including an application specific integrated circuit (ASIC) that is an integrated circuit customized for a particular purpose), computer readable medium (CRM) or a memory 1030, a clock 1032, a transmitter/receiver 1034, a display 1036, an interface 1038 (such as a network interface, a graphical user interface, a natural language user interface, or other type of interface), a recognizer 1040 (such as object recognition software, facial recognition software, and/or animal recognition software), a distance determiner 1042 (such as a laser, a rangefinder, or a camera), an orientation or inclination determiner 1044 (such as a tilt sensor, level determiner, inclinometer, gyroscope, compass, and/or an accelerometer), a power supply 1046 (such as a rechargeable battery), and a firearm event tracker 1048 (such as hardware and/or software to execute one or more example embodiments).

Figure 11:
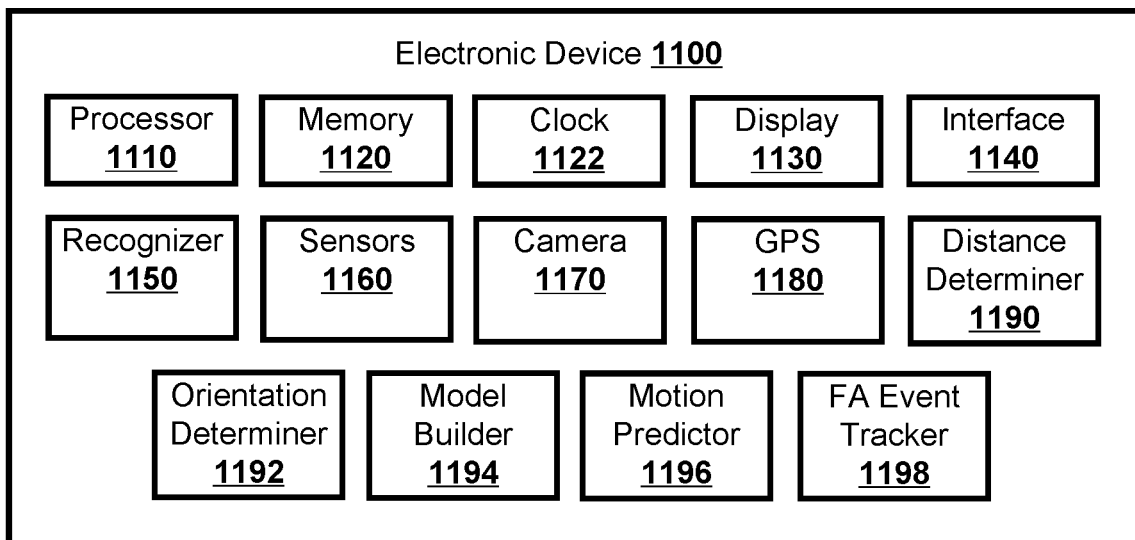
FIG. 11 is a computer or an electronic device in accordance with an example embodiment.

FIG. 11 is a computer or an electronic device 1100 that includes one or more of a processing unit or processor 1110 (including an application specific integrated circuit (ASIC) that is an integrated circuit customized for a particular purpose), a computer readable medium (CRM) or memory 1120, a clock 1122, a display 1130, one or more interfaces 1140 (such as a network interface, a graphical user interface, a natural language user interface, and/or an interface that combines reality and virtuality), one or more recognizers 1150 (such as object recognition software, facial recognition software, and/or animal recognition software), one or more sensors 1160 (such as micro-electro-mechanical systems sensor, a motion sensor, an optical sensor, radio-frequency identification sensor, a global positioning satellite sensor, a solid state compass, gyroscope, and an accelerometer), a camera 1170, a GPS locator GPS system or GPS tracking unit 1180, a distance determiner 1190 (such as a laser, a rangefinder, a camera, and/or a camera), an orientation determiner 1192 (such as a tilt sensor, level determiner, inclinometer, and/or an accelerometer), an image processor or modeler or model builder 1194, a firearm aim or motion predictor 1196, and a firearm event tracker 1198 (such as hardware and/or software to execute one or more example embodiments).

The motion predictor or predictor 1196 predicts or estimates movements of the firearm at a future time, such as movements of locations of the firearm and movements of the point of aim of the firearm. The predictor can also predict user actions in the future (such as a likelihood that the user will fire a shot) and points of impact for a bullet fired from the firearm. For instance, determinations by a software application, an electronic device, and/or the user agent can be modeled as a prediction that the user with take an action and move the firearm in a particular direction or with a particular rotation. For example, an analysis of historic events, personal information, geographic location, and/or the user profile provides a probability and/or likelihood that the user will take an action (such as whether the user will move the point of aim of the firearm or the firearm itself up, down, left, or right with respect to the user). By way of example, one or more predictive models are used to predict the probability that a user would take, determine, or desire the action.

The predictive models can use one or more classifiers to determine these probabilities. Example models and/or classifiers include, but are not limited to, a Naive Bayes classifier (including classifiers that apply Bayes' theorem), k-nearest neighbor algorithm (k-NN, including classifying objects based on a closeness to training examples in feature space), statistics (including the collection, organization, and analysis of data), collaborative filtering, support vector machine (SVM, including supervised learning models that analyze data and recognize patterns in data), data mining (including discovery of patterns in datasets), artificial intelligence (including systems that use intelligent agents to perceive environments and take action based on the perceptions), machine learning (including systems that learn from data), pattern recognition (including classification, regression, sequence labeling, speech tagging, and parsing), knowledge discovery (including the creation and analysis of data from databases and unstructured data sources), logistic regression (including generation of predictions using continuous and/or discrete variables), group method of data handling (GMDH, including inductive algorithms that model multi-parameter data) and uplift modeling (including analyzing and modeling changes in probability due to an action).

Consider an example in which a firearm event tracker tracks and stores event data over a period of time, such as days, weeks, months, or years for users of firearms. This event data includes recording and analyzing patterns of actions with the firearm and motions of the firearm while the user holds the firearm, loads the firearm, unloads the firearm, aims the firearm, and fires the firearm. Based on this historic information, the motion predictor predicts what action a particular user will take with a firearm (e.g., whether the user will fire the firearm, where the user will take the firearm, where the user will point the firearm, motions or paths of the point of aim while the user is aiming the firearm, in which hand the user will hold the firearm, where the user will store the firearm, etc.).

By way of example, the modeler 1194 is or includes an image processor or digital image processor that converts images (such as photos) or video into 2D or 3D images or video, 2D or 3D pictures, or 2D or 3D models. For example, a 3D modeler converts a photo into a bitmap image, vectorizes and extrapolates the image, and generates a 3D model of the photo. As another example, 2D images are combined and/or offset to generate a stereoscopic image that provides 3D depth perception. As another example, a 3D converter converts 2D video into 3D video. As another example, a 3D modeler receives a series of photos of a target or object or person from multiple views, matches the views, calculates spatial positioning, and generates a 3D point-cloud model that is rotatable three hundred and sixty degrees (360°). As another example, a photo-modeler performs image based modeling and close range photogrammetry (CRP) to generate measurements from photos and produce 3D models. As another example, a 3D modeler retrieves one or more aerial and/or ground photos and executes aerial photogrammetry to generate 2D or 3D models (such as a topographical map or a 3D landscape). As another example, a 3D modeler processes video images and renders these images into a rotatable two-dimensional image. As another example, a 3D modeler processes photos and/or video and generates one or more of a polygonal model of the image, a curve model, and a digital sculpture. The models are displayed on a display, stored in memory, processed, and/or transmitted.

FIGS. 10 and 11 show various components in a single electronic device. One or more of these components can be distributed or included in various electronic devices, such as some components being included in an HPED, some components being included in a server, some components being included in storage accessible over the Internet, some components being in wearable electronic devices or a weapon or firearm, some components being included a device that attaches to a firearm (such as an electronic scope), and some components being in various different electronic devices that are spread across a network, a cloud, and/or a weapon targeting system.

The processing unit or processor (such as a central processing unit, controller, CPU, microprocessor, application-specific integrated circuit (ASIC), etc.) controls the overall operation of memory (such as random access memory (RAM) for temporary data storage, read only memory (ROM) for permanent data storage, and firmware). The processing unit or processor communicates with memory and performs operations and tasks that implement one or more blocks of the flow diagrams discussed herein. The memory, for example, stores applications, data, programs, algorithms (including software to implement or assist in implementing example embodiments) and other data.

Consider an example in which electronics in a firearm include a gyroscope and/or accelerometer. A method to determine tilt or inclination of the firearm is to integrate output of the gyroscope and/or accelerometer to determine X-axis rotation, Y-axis rotation, and/or Z-axis rotation. Another method to determine tilt or inclination is to convert output of an accelerometer to an angle of inclination. For example, inclination can be calculated for a single-axis solution, a dual-axis solution, or a triple-axis solution with one or more sensors (such as using two orthogonal sensors). For instance, a single x-axis sensor calculates an angle of inclination based on a gravity vector. In order to distinguish angles of inclination in 360°, a second or third sensor can be used (e.g., using one or more sensors to detect X-axis acceleration, Y-axis acceleration, and Z-axis acceleration).

Consider an example in which electronics in a firearm include a three-axis accelerometer, a three-axis gyroscope, and a three-axis compass that measure nine degrees-of-freedom (DoF). For instance, an accelerometer chip, a gyroscope chip, and an electronic compass chip are placed adjacent or near a microprocessor on one or more sides of the main printed circuit board (PCB) located inside of the housing of the firearm.

Consider an example in which electronics in a firearm include a MEMS (microelectromechanical systems) accelerometer (such as a stacked configuration with an ASIC chip and a MEMS chip or a side-by-side configuration with an ASIC chip and a MEMS chip, such as a STMicroelectronics MEMS accelerometer).

Consider an example in which electronics in a firearm include a three-axis digital output gyroscope, such as a MEMS motion sensor or MEMS gyroscope (such as a stacked configuration with an ASIC chip and a MEMS chip or a side-by-side configuration with an ASIC chip and a MEMS chip, such as an STMicroelectronics MEMS gyroscope).

Consider an example in which electronics in a firearm include a three-axis electronic compass (such as an Asahi Kasei Microdevice compass). The electronic compass can compute direction based on the Hall Effect and include numerous discrete Hall sensor devices.

Consider an example in which electronics in the firearm include a Motion Processing Unit (MPU), a MEMS 3-axis gyroscope, a 3-axis accelerometer on a silicon die along with a Digital Motion Processor (DMP) that processes multi-axis algorithms.

Consider an example in which electronics in the firearm include one or more accelerometers and gyroscopes for multiple axes sensing to provide six full degrees of freedom. For example, the electronics include an Inertial Measurement Unit (IMU). An IMU is an electronic device that measures and provides force, angular rate, and sometimes magnetic field on a body (such as the firearm) using one or more of accelerometers, gyroscopes, and magnetometers. An IMU can also be a wireless IMU (WIMU).

Consider an example in which the electronics in the firearm include a vibrating structure gyroscope or Coriolis vibratory gyroscope (CVG).

Blocks and/or methods discussed herein can be executed and/or made by a user, a user agent of a user, a software application, an electronic device, hardware, a computer, and/or a computer system.

As used herein, a "firearm" is a portable gun, such as a rifle or a pistol.

As used herein, the "line of sight" is a straight line that extends from the scope or other sighting apparatus to the point of aim.

As used herein, the "line of trajectory" or the "ballistic trajectory" is the line or flight path that a projectile follows while in flight after being fired from a weapon.

As used herein, a "point of aim" is where a weapon is pointed.

As used herein, a "point of impact" is a location where a projectile fired from a weapon impacts an object.

As used herein, a "weapon" includes firearms (such as portable guns), archery (such as bow and arrows), light weapons, heavy weapons, and other weapons that launch, fire, or release a projectile.

As used herein, a "wearable electronic device" is a portable electronic device that is worn on or attached to a person. Examples of such devices include, but are not limited to, electronic watches, electronic necklaces, electronic clothing, head-mounted displays, electronic eyeglasses or eye wear (such as glasses in which an image is projected through, shown on, or reflected off a surface), electronic contact lenses, an eyetap, handheld displays that affix to a hand or wrist or arm, and HPEDs that attach to or affix to a person.

In some example embodiments, the methods illustrated herein and data and instructions associated therewith are stored in respective storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

Method blocks discussed herein can be automated and executed by a computer, computer system, user agent, and/or electronic device. The term "automated" means controlled operation of an apparatus, system, and/or process using computers and/or mechanical/electrical devices without the necessity of human intervention, observation, effort, and/or decision.

The methods in accordance with example embodiments are provided as examples, and examples from one method should not be construed to limit examples from another method. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

What is claimed is:

1. A method, comprising:
   receiving, from a wearable electronic device (WED) worn on a head of a user, event data that includes movements of the user at a location and movements of a firearm held by the user at the location;
   reconstructing, from the event data, a three-dimensional (3D) model in augmented reality (AR) that simultaneously shows the user with the firearm at the location, the movements of the user at the location, and the movements of the firearm held by the user at the location; and
   displaying, with a display of the WED worn on the head of the user, the 3D model in the AR that simultaneously shows the user with the firearm at the location, the movements of the user at the location, and the movements of the firearm held by the user at the location.

2. The method of claim 1 further comprising:
   training the user by displaying, with the display of the WED worn on the head of the user, the movements of the user at the location and the movements of the firearm held by the user at the location to recreate how the user and firearm moved at the location, wherein the 3D model in AR includes a point of view of the user holding the firearm.

3. The method of claim 1 further comprising:
   displaying, with the display of the WED worn on the head of the user, an AR image that shows a compass direction of a point of aim of the firearm.

4. The method of claim 1 further comprising:
   displaying, with the display of the WED worn on the head of the user, different orientations of the firearm that show where the firearm was pointed while the user was moving at the location.

5. The method of claim 1 further comprising:
   displaying, with the display of the WED worn on the head of the user, a 3D trajectory of a bullet fired from the firearm at the location.

6. The method of claim 1 further comprising:
   replaying, with the WED worn on the head of the user, the event data that includes a verbal command issued from the user to the WED.

7. The method of claim 1 further comprising:
   displaying, with the display of the WED worn on the head of the user, the movements of the firearm that include AR images of the firearm that provide both angles of the firearm and directions of where the firearm was pointed while the user was at the location holding the firearm.

8. The method of claim 1 further comprising:
   moving, on the display of the WED worn on the head of the user, an AR image of the firearm to emulate actual movements of the firearm while the user was holding the firearm at the location.

9. The method of claim 1 further comprising:
   displaying, with a display of another WED worn on a head of another user, the event data that includes video captured with a camera of the WED worn on the head of the user.

10. A method comprising:
    reconstructing, from event data captured with a wearable electronic device (WED) worn on a head of a user with a firearm at a location, a three-dimensional (3D) augmented reality (AR) model of the location that includes the user with the firearm; and
    training the user by displaying, with the WED worn on the head of the user, the 3D AR model that shows the location, the user with the firearm at the location, and movements of the user with the firearm at the location.

11. The method of claim 10 further comprising:
    displaying, with another WED worn on a head of another user, the 3D AR model that shows the location, the user with the firearm at the location, and movements of the user with the firearm at the location.

12. The method of claim 10 further comprising:
capturing, with a camera on the WED worn on the head of the user, video that shows what the user sees at the location; and
displaying, with another WED worn on a head of another user, the video that shows what the user sees in real-time while the user at the location.

13. The method of claim 10 further comprising:
displaying, with the display of the WED worn on the head of the user, the user and the firearm as an animation in AR that includes arms and hands of the user holding the firearm.

14. The method of claim 10 further comprising:
simultaneously displaying, with the display of the WED worn on the head of the user, a point of aim of the firearm along with AR hands of the user holding an AR image of the firearm.

15. The method of claim 10 further comprising:
displaying, with the display of the WED worn on the head of the user, an AR image of a trajectory of a bullet fired from the firearm.

16. A computer system comprising:
a receiver that receives event data captured with a wearable electronic device (WED) worn on a head of a user holding a firearm while at a location;
one or more processors that build, from the event data captured with the WED, an augmented reality (AR) model of the location that includes the user with the firearm; and
a display that trains the user by displaying the AR model of the location that shows the user holding the firearm at the location, movements of the user while at the location, and movements of the firearm while the user holds the firearm, wherein the movements of the user and the movements of the firearm being displayed emulate actual movements of the user and the firearm when the user was moving at the location.

17. The computer system of claim 16, wherein the display is on the WED that the user wore at the location, and the display simultaneously displays the point of aim of the firearm and a compass direction of the point of aim of the firearm.

18. The computer system of claim 16, wherein the display displays an AR model includes a topographical map generated from aerial photogrammetry of the location and displays an AR image of the user along with AR images of other users at the location.

19. The computer system of claim 16, wherein the receiver receives the event data from the WED while the WED is at the location, and the computer system provides, to other users wearing WEDs, the AR model that shows the movements of the user and the movements of the firearm at the location.

20. The computer system of claim 16, wherein the WED includes the display that simultaneously displays a point of aim of the firearm held in hands of the user along with an augmented reality (AR) image of the firearm that moves to emulate real-time movements of the firearm while the user was at the location.

\* \* \* \* \*